United States Patent
Sudau

[11] Patent Number: 6,109,134
[45] Date of Patent: Aug. 29, 2000

[54] TORSIONAL VIBRATION DAMPER WITH ROLLING BODIES AS COUPLING

[75] Inventor: Jörg Sudau, Niederwerrn, Germany

[73] Assignee: Mannesmann Sachs AG, Schweinfurt, Germany

[21] Appl. No.: 09/130,758

[22] Filed: Aug. 7, 1998

[30] Foreign Application Priority Data

Aug. 8, 1997 [DE] Germany .......................... 197 34 322

[51] Int. Cl.⁷ ................................................ F16F 15/121
[52] U.S. Cl. ............................ 74/574; 192/207; 464/81; 464/84
[58] Field of Search ............................. 74/574; 192/55.6, 192/207; 464/68, 24, 81, 84, 100, 101

[56] References Cited

U.S. PATENT DOCUMENTS

| | | | |
|---|---|---|---|
| 1,692,978 | 11/1928 | Dunham | 464/81 |
| 2,205,401 | 6/1940 | Fischer . | |
| 2,398,261 | 4/1946 | Stone | 192/55.6 |
| 2,567,125 | 9/1951 | Ruch | 192/55.6 |
| 2,814,187 | 11/1957 | Babaian | 464/84 |
| 4,359,985 | 11/1982 | Mueller | 464/84 |
| 4,465,172 | 8/1984 | Gatewood | 192/207 |
| 4,800,996 | 1/1989 | Loizeau . | |
| 5,295,411 | 3/1994 | Speckhart . | |
| 5,557,984 | 9/1996 | Cooke et al. | 74/574 |
| 5,819,598 | 10/1998 | Cooke et al. | 74/574 |

FOREIGN PATENT DOCUMENTS

| | | |
|---|---|---|
| 507 212 | 10/1992 | European Pat. Off. . |
| 41 28 868 | 3/1993 | Germany . |
| 197 26 532 | 3/1998 | Germany . |

*Primary Examiner*—Thomas R. Hannon
*Assistant Examiner*—Chong H. Kim
*Attorney, Agent, or Firm*—Cohen, Pontani, Lieberman & Pavane

[57] ABSTRACT

A torsional vibration damper with a plurality of transmission elements which are rotatable relative to one another about a common axis of rotation. The relative movement of the transmission elements carried out by the deflection of coupling elements which are displaceable between the transmission elements along at least one guide path in the circumferential direction and which are in a working connection with the two transmission elements for this purpose. The guide path which is provided on at least one of the transmission elements is provided with a curvature which serves to receive a coupling body which is provided at the other transmission element and which is preferably formed with its own curvature at least along its rolling area facing the guide path. A predetermined elasticity is provided at least at one of the two structural component parts—guide path/coupling body—at least along a partial area of the respective curvature so that, when loaded by the other structural component part, a deformation is achieved for adapting the shape of its curvature to the shape of the curvature of the other structural component part.

5 Claims, 6 Drawing Sheets

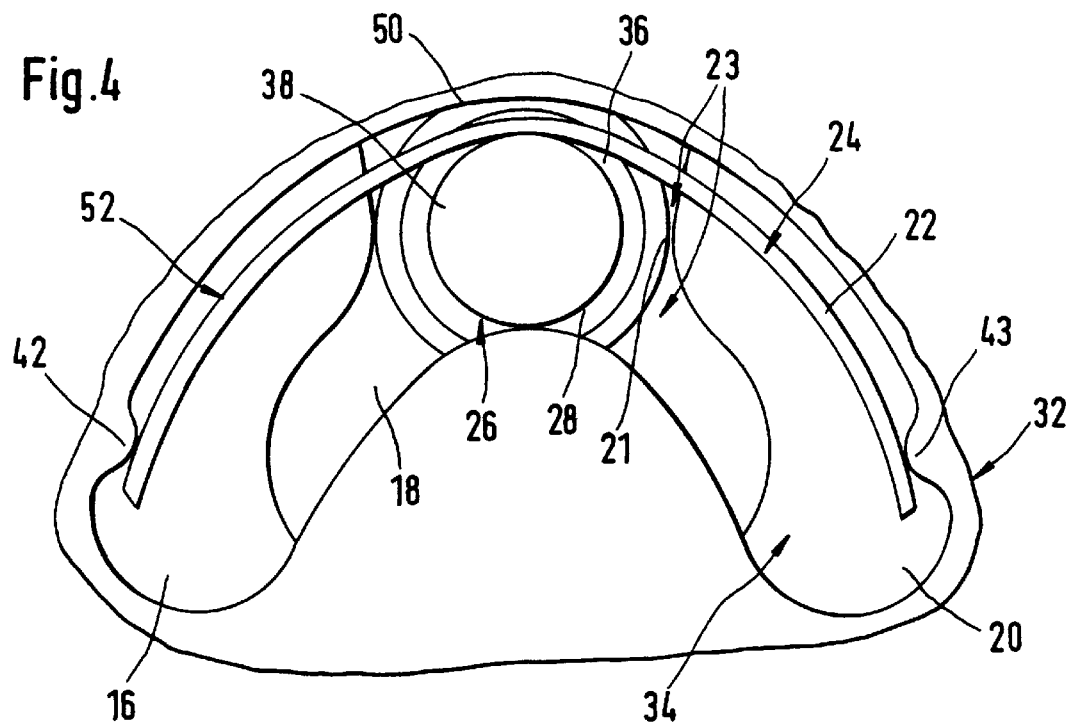
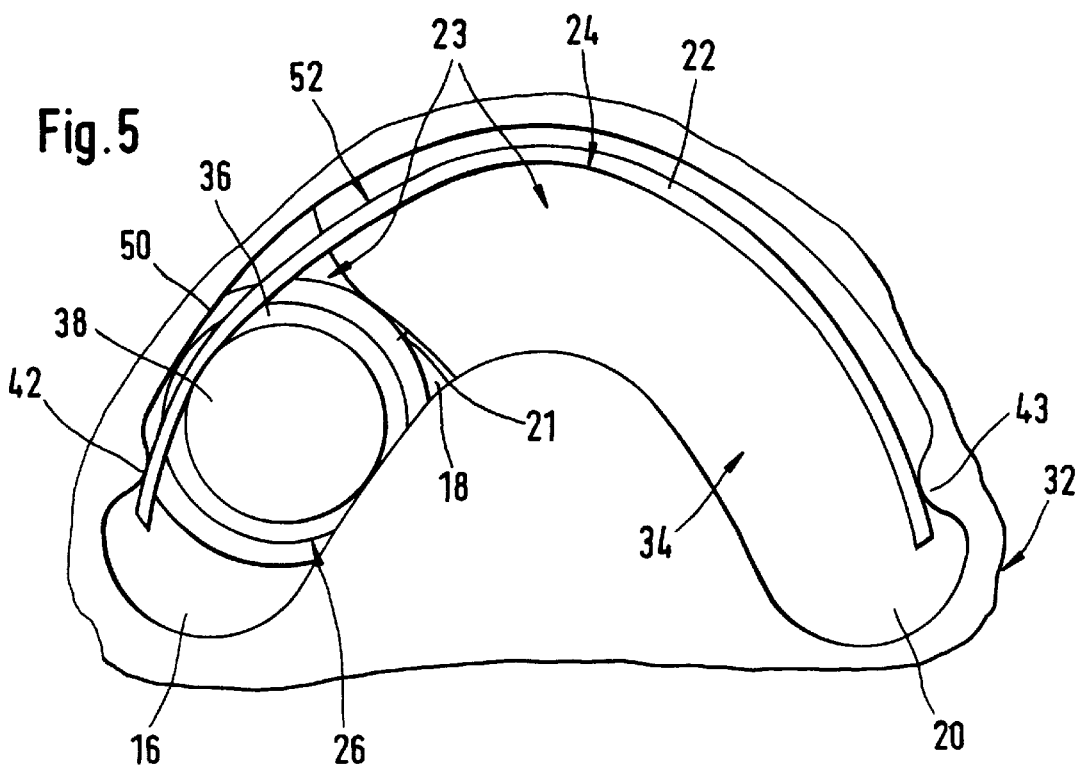

TORSIONAL VIBRATION DAMPER WITH ROLLING BODIES AS COUPLING

BACKGROUND OF THE INVENTION

1. Field of the Invention

The invention is directed to a torsional vibration damper having a plurality of transmission elements which are rotatable relative to one another about a common axis of rotation.

2. Discussion of the Prior Art

German reference DE 41 28 868 discloses a torsional vibration damper having a transmission element on the drive side and a transmission element on the driven side which is rotatable relative to the drive-side transmission element against the action of a damping device. The damping device serves to transmit torque between the two transmission elements. The damping device has springs which are guided along a guide path via slide blocks and which serve as displaceable coupling bodies. A plurality of these springs are combined in a spring set which is in a working connection with one of the transmission elements at one end and with the other transmission element at the other end such that a deflection of one of the transmission elements in the circumferential direction by a relative movement of the coupling body results in a deflection of the other transmission element. Every coupling body is arranged in a recess of one of the transmission elements, which recess has the guide path, and is connected with a driver device of the other transmission element. The driver device is formed by the control element acting on the spring set.

Torsional vibration dampers according to the above-mentioned reference are suitable for filtering a complete frequency range, that is, for damping amplitudes of different orders. However, particularly troublesome amplitudes of a certain order cannot be effectively suppressed in the manner that is often required.

By constructing the coupling bodies as springs, it is ensured that the two transmission elements will be moved back into their initial position after every relative deflection brought about by a torsional vibration. Thus, the two transmission elements have an exactly defined reference position relative to one another in the unloaded state. However, a disadvantage in such coupling bodies is that the inertia which the corresponding transmission element sets in opposition to an introduced torsional vibration is not changeable. Furthermore, the constructional design of such a torsional vibration damper is relatively complicated, since control elements must be provided for the springs at both flywheel masses, the springs acting between these control elements.

A transmission element in the form of a flywheel mass is known from U.S. Pat. No. 5,295,411, in which a circular compensating flywheel mass is received in each of a plurality of circular cavities. The diameter of the compensating flywheel mass is smaller than that of the cavity. A flywheel mass of this type is commonly referred to as a Salomon or Solomon damper and has the advantage that the compensating flywheel masses are dependent on changes in speed at the flywheel mass with respect to their deflection speed. With a flywheel mass of this kind, torsional vibrations of a determined order, preferably of the second order in four-cylinder internal combustion engines, can be advantageously reduced by a determined amount at defined amplitude values; however, it is not possible to influence vibrations of another order. Further, wear can result in the running area of the compensating flywheel mass in the cavity or recess, so that the recess changes shape. This in turn influences the deflection behavior of the compensating flywheel mass and accordingly the damper behavior of the flywheel mass.

U.S. Pat. No. 2,205,401 shows another damper in which a flywheel mass having a guide path for damper masses which are in a working connection with an actuating or adjusting device is fastened to a drive, for example, a crankshaft. The damper masses, as well as the guide path associated therewith, have a curvature, preferably in a circular shape, wherein the radius of curvature of the damper masses is smaller than that of the associated guide paths so as to enable a rolling movement of the damper masses in the guide paths when torsional vibrations are introduced via the flywheel mass. The reason for the existence of a plurality of guide paths and the adjusting device mentioned above is so that the damper masses can be brought, during an adjusting process by the adjusting device, into the respective guide path required for damping a torsional vibration of a determined order occurring precisely at that time. Accordingly, in contrast to the damper discussed above in connection with U.S. Pat. No. 5,295,411, not only one order but a plurality of orders can be reduced by a determined amount. Nevertheless, there is again no possibility of influencing torsional vibrations of other orders. The problem of wear at the guide path discussed above also exists.

SUMMARY OF THE INVENTION

The object of the present invention is to provide a torsional vibration damper so that the torsional vibrations generated by a drive, such as an internal combustion engine, for example, can be filtered out as far as possible with minimum resulting wear and with the most economical possible design.

Pursuant to this object, and others which will become apparent hereafter, one aspect of the present invention resides in a torsional vibration damper comprised of two transmission elements which are rotatable relative to one another about a common axis of rotation. Coupling elements are displacable between the transmission elements along at least one guide path in a circumferential direction and are in working connection with the two transmission elements so as to permit relative movement between the transmission elements. The guide path is provided on at least one of the transmission elements so as to have a curvature with a curvature location having a maximum distance from the axis of rotation. A coupling body is provided on the other transmission element so as to be received by the guide path. The coupling body has a rolling area which faces the guide path and has its own curvature. A path body of predetermined elasticity is provided on one of the guide path and the coupling body at least along a partial area of the respective curvature so that when loaded by the other of the guide path and the coupling body a deformation is achieved for adapting the curvature shaped to the curvature of the other of the guide path and the coupling body.

The construction of the torsional vibration damper with a guide path for a coupling body and with the coupling body itself has the following results. As soon as the torsional vibration damper is set in rotation about its axis of rotation, the coupling body is pushed radially outward by the centrifugal force within a recess receiving the same, which recess can be provided, for example, in one of the transmission elements, and comes to a stop in a position in which the curvature location of the guide path is at a maximum distance from the axis of rotation. A further increase in the rate of rotation no longer results in a change in position of the coupling body but, nevertheless, owing to the further increase in centrifugal force, causes increased area pressure between the coupling body and the guide path. As a result of the elasticity, according to the invention, at the path body of at least one of the structural component parts, namely, the guide path and coupling body, the curvature of this path body matches that of the other structural component part, so that the contact region between the two structural component parts becomes larger with increasing load, for example, due to centrifugal force. This results in a reduced loading of the path body. At the same time, when this elasticity is achieved by means of a leaf spring serving as the spring element, the strength in the region of wear can easily be increased in that the leaf spring is formed of hardened steel or steel with a greater core strength.

Further, the damping behavior depends not only on the position of the speed of the coupling body in the guide path, but also on the occurring loads. In the case of an elastic guide path, this guide path is flexible radially, for example, without the coupling body having to carry out a relative movement along the guide path. This is useful, for example, in the case of a torque shock in which the coupling body would not undergo a rolling movement due to its inertia.

Regardless of the advantage resulting from the elasticity at the path body, when torsional vibrations and/or torque are introduced from the drive-side transmission element to the driven-side transmission element, the coupling body tends, because of its inertia, to detach itself from its above-described position by means of a rolling or sliding process on the guide path, specifically in such a way that it is deflected in the direction opposite to the acceleration direction of the transmission element receiving it, wherein the extent of deflection depends on the magnitude of the torsional vibration or torque. This deflection thus acts in the direction opposite to the radially outwardly directed centrifugal force, which becomes more pronounced the higher the rate of rotation of the torsional vibration damper. To this extent, the behavior of the coupling body is dependent on the rate of rotation in that a deflection of this coupling body due to a torsional vibration becomes increasingly difficult as the rate of rotation of the torsional vibration damper increases. Thus, the behavior of the coupling body corresponds to that of a spring in which the stiffness would increase as the rate of rotation increases.

It has proven particularly advantageous to construct the guide path so as to be elastic, for example, using leaf springs as path bodies. Through the use of leaf springs of this type, complicated characteristic lines can be formed, wherein the geometry of these leaf springs changes depending on the position of the coupling body corresponding to the stiffness of the leaf springs. The quantity and spacing of support locations for the leaf springs and the loads act via the coupling body. This characteristic will be described more fully hereinafter by way of example.

In a torsional vibration damper with coupling bodies, the contact pressure of every coupling body pressing against the associated guide path increases as the rate of rotation increases due to centrifugal force, provided this guide path is arranged radially outside of the coupling body. The torsional vibration damper accordingly has a more rigid action than at a lower rate of rotation. This can be augmented by arranging a support of the leaf spring in the circumferential direction at the greatest possible distance from the region where the coupling body is located in the absence of deflection in the circumferential direction, since the curvature of the guide path accordingly increases in this region. Conversely, the addition of a support in this region causes a decrease in rigidity in some regions because, as viewed in the circumferential direction at either side of this support, the curvature of the guide path becomes flatter as the rate of rotation increases.

Apart from the elasticity at the guide path and/or coupling body, as a result of the coupling body being received at the other transmission element in such a way that it is movable in the radial direction, but fixed in the circumferential direction, the driven-side transmission element is carried along when a torsional vibration is introduced to the drive-side transmission element. In this respect, the coupling body acts as a coupling element between the two transmission elements and accordingly fulfills the task which is met in the prior art by springs, but, beyond this, also provides the advantage, due to its rolling or sliding movement along the guide path, that it increases the inertia of the drive-side transmission element when a torsional vibration is introduced. Because of this, the coupling body in the proposed torsional vibration damper acts not only as a coupling element between the transmission elements, but also acts as a compensating flywheel mass of a damper element as in the case of the Solomon damper, for example. Insofar as the damping of torsional vibrations is concerned, this results in excellent characteristics.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 4 shows a detail from a guide path with coupling bodies contacting the center of the spring element;

FIG. 5 corresponds to FIG. 2, but shows the coupling body deflected in the circumferential direction;

DETAILED DESCRIPTION OF THE PREFERRED EMBODIMENTS

Figure 1:
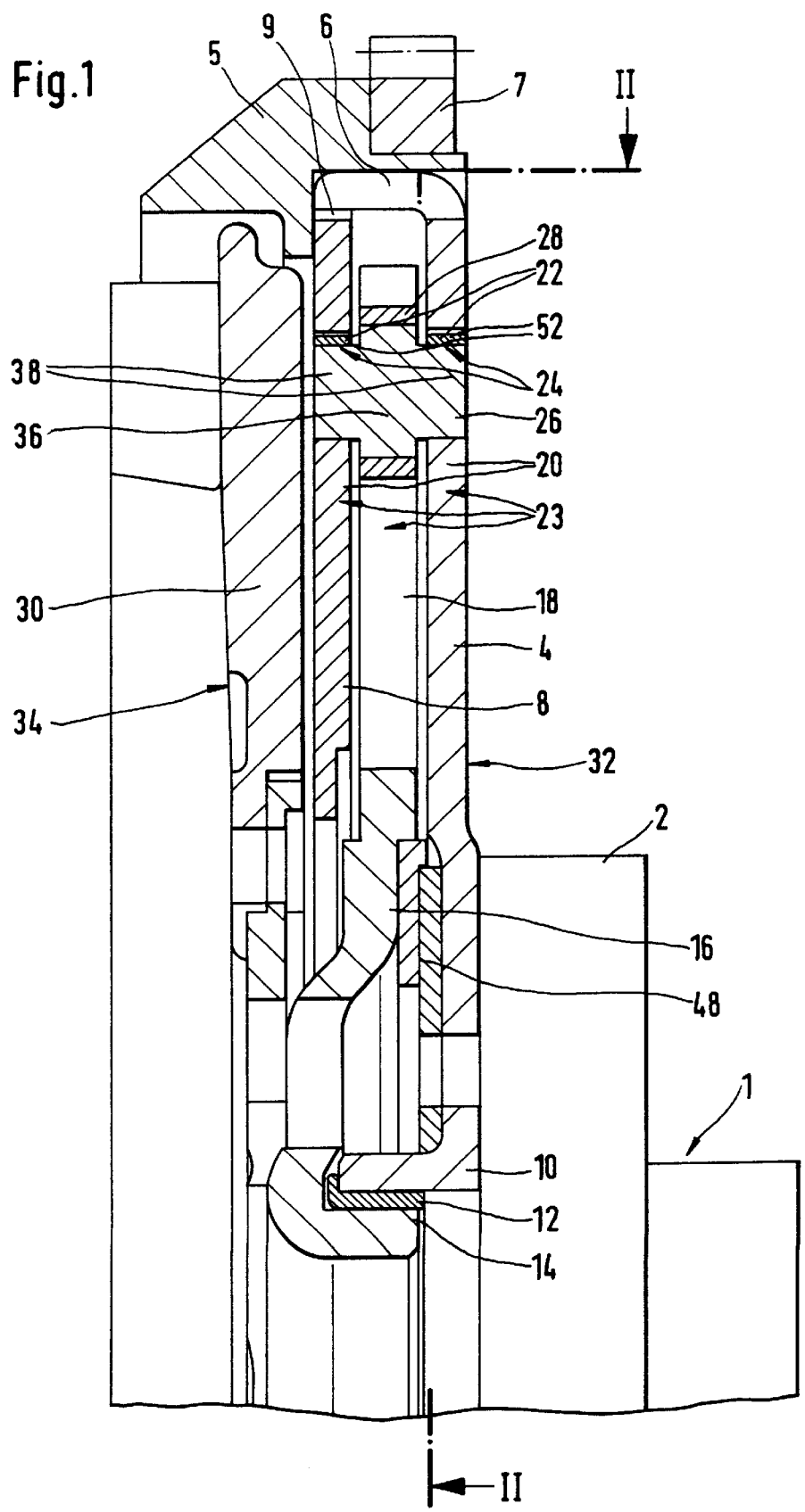
FIG. 1 is a longitudinal section through an upper half of the torsional vibration damper with a coupling body received in a recess of the drive-side transmission element, which coupling body is received in a fixed manner in the circumferential direction in a radial cutout of a driven-side transmission element.
Figure 2:
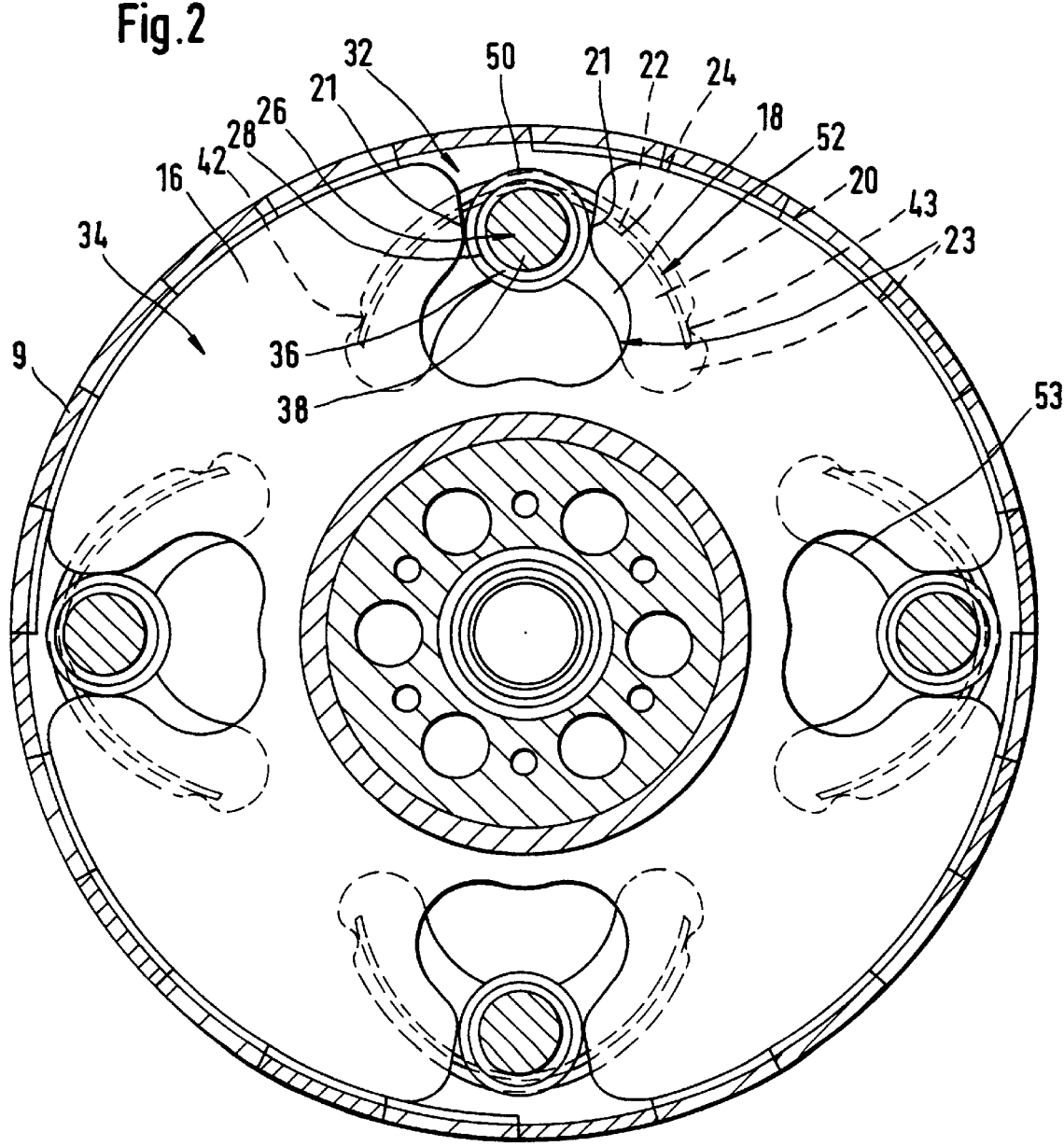
FIG. 2 is a sectional view along line II—II in FIG. 1, with guide paths for the coupling body, each of these guide paths having a spring element.
Figure 3:
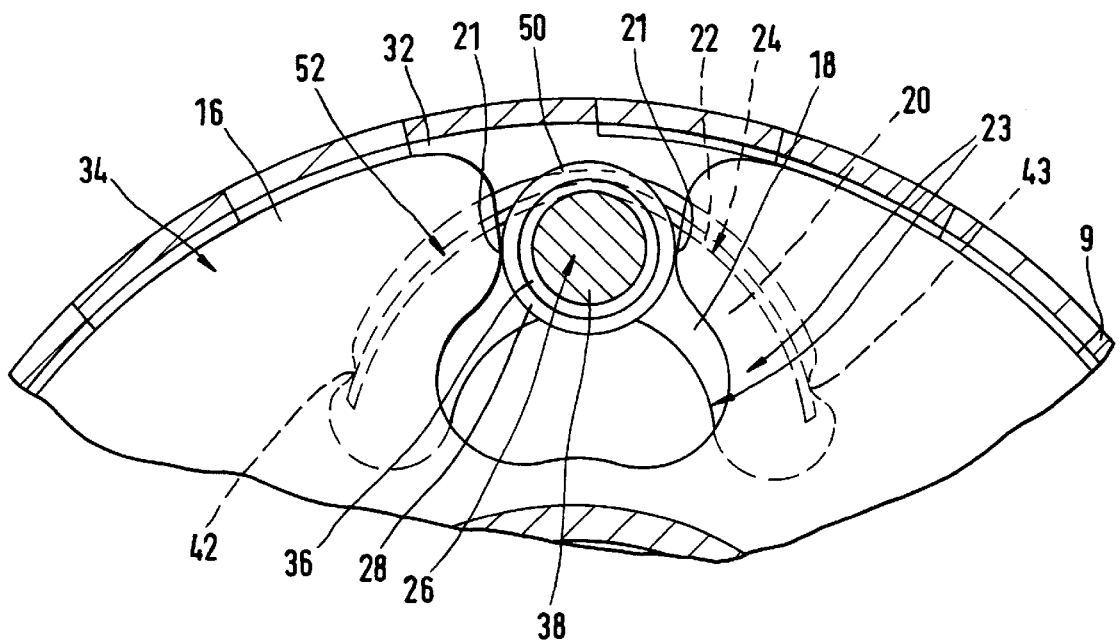
FIG. 3 shows an enlarged detail of a segment from FIG. 2.
Figure 6:
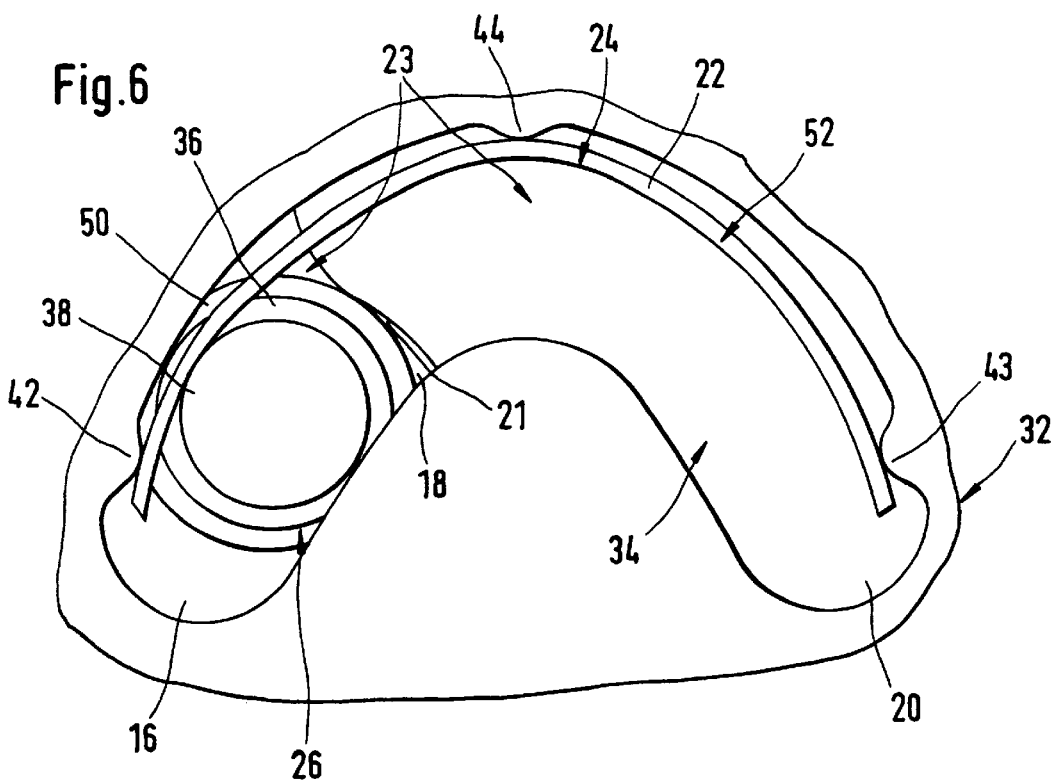
FIG. 6 corresponds to FIG. 5, but shows an additional center support for the spring element.

FIGS. 1 to 3 are schematic views of a torsional vibration damper in the form of a two-mass flywheel. A primary flange 4 which extends outward radially is fastened in a manner that is not shown to a drive 1 in the form of a crankshaft 2. The primary flange 4 has bent portions 6 in the radial outer region which are distributed around the circumference and extend in the direction facing away from the crankshaft 2 and communicate, without play in the circumferential direction, with bent portions 9 of a cover plate 8 which extend in the direction of the crankshaft 2. The axial connection of the primary flange 4 with the cover plate 8 is effected by means of a flywheel mass 5 which is pressed on in the circumferential area and carries a toothed rim 7 which engages with the teeth of a starter pinion, not shown. The primary flange 4, the cover plate 8 and the flywheel mass 5 form a drive-side transmission element 32.

A hub disk 16 is provided axially between the primary flange 4 and the cover plate 8 and has, at its radial inner end, a secondary hub 14 which extends in the direction of the crankshaft 2 and is enclosed radially by a bearing 12 which is guided in turn at the radial inner side of a primary hub 10 which is formed at the inner circumference of the primary flange 4 and extends in the direction of the hub disk 16. The hub disk 16, which acts as a driven-side transmission element 34 by means of a connection, not shown, with a flywheel mass 30, is centered relative to the drive-side transmission element 32 by the bearing 12.

The hub disk 16 can be seen more clearly in FIG. 2 in which it is shown by a section II—II illustrated in FIG. 1. The hub disk 16 has cutouts 18 which are distributed uniformly over the circumference. A rolling body 36 is received in each cutout 18 so as to be movable. Every cutout 18 is larger in the radial inner region, viewed in the circumferential direction, than the rolling body 36 but becomes narrower at the radial outside, so that, depending on the embodiment, the rolling body 36 is held at this narrow region 21 virtually without play or with predetermined play. Recesses 20 in the primary flange 4 and in the cover plate 8 are associated with the cutout 18 in the hub disk 16. As can be seen in FIG. 2 or FIG. 3, these recesses 20 have a curved shape and serve to receive pin-shaped projections 38 formed at both sides of the rolling body 36. The recesses 20 are provided in the radial outer region with a leaf-springlike spring element 22 which, as can be seen more clearly from FIG. 4, for example, is mounted on both sides of the center of each of these recesses 20 by means of support locations 42, 43. Each of these spring elements 22 acts as a guide path 24 for a coupling body 26 formed by the rolling body 36 and the projections 38. As will be explained more fully hereinafter, this coupling body 26 can carry out a movement in the recesses 20 as well as in the cutout 18 simultaneously when the transmission elements 32, 34 are deflected relative to one another. In this connection, there is a risk that the coupling body 26 will carry out a sliding movement instead of a rolling movement in the region of one of these cut out locations 18, 20, which could lead to an undesirably high degree of wear especially in the narrow region of the hub disk 16 because of a purely transverse movement of the coupling body 26 relative to the cutout in some areas. Therefore, the coupling body 26 is provided in the region of the rolling body 36 with a running ring 28 which is rotatably arranged on the actual rolling body 36 by means of an intermediate layer having extensive sliding capability, wherein, however, this rolling body 36 should further have a surface strength in its circumferential area for lasting resistance to wear. For this reason, it is possible to produce the actual running ring 28, as well as the rolling body 36, from steel and to insert a slide-promoting layer, e.g., in the form of a Teflon coating, between these two parts.

The device functions in such a way that when a torsional vibration is introduced at the crankshaft 2, the drive-side transmission element 32 executes a rotational irregularity which in turn results in a deflection of the coupling body 26 in the opposite rotating direction, wherein the extent of the deflection of the coupling body 26 depends on the magnitude of the torsional vibration as well as on the ascending slope of the guide paths and on the rate of rotation of the torsional vibration damper, since the centrifugal force increases as the rate of rotation increases and, accordingly, the contact pressure of the coupling body 26 pressing against the curvature location of the guide paths 24 which has the greatest distance from the axis of rotation is extremely high as is, accordingly, the inertia which the coupling body 26 sets in opposition to a deflection under the influence of a torsional vibration. Conversely, at a very low rate of rotation, the introduction of a torsional vibration leads very easily to a deflection of the coupling body from this curvature location. The coupling body 26 accordingly also acts as a speed-independent damper.

The deflection of the coupling body 26 from the curvature location of the guide path 24 is likewise carried out when the torque present at the drive-side transmission element 32 is transmitted to the driven-side transmission element 34 via the coupling body 26, wherein the extent of deflection of the coupling body 26 depends to a great extent on the magnitude of this torque. In this connection, an increase in torque causes, by way of the deflection of the coupling body 26 in the recesses 20, the coupling body 26 to be drawn radially inward into the cutout 18 against the action of centrifugal force until a force equilibrium is adjusted. The guide paths 24 can be configured by means of the respective curvature so that small deflections from the center curvature location are effected against relatively slight resistance, while increasing deflection resistance builds up as the extent of deflection increases. A limiting of the extent of deflection is produced by the guide paths 24 when the coupling body 26 comes into contact with one of the ends on the circumferential side.

When the projections 38 of the coupling body 26 are engaged in the cutout 18 of the driven-side transmission element 34 without play in the circumferential direction when reaching the narrow region 21 of the cutout 18 on the circumferential side at its radial outer region, a deflection of the coupling body 26 is transmitted directly to the driven-side transmission element 34, so that this transmission element 34 is moved in the direction opposite to the deflecting direction of the drive-side transmission element 32. However, the torsional vibration arriving at the driven-side transmission element 34 is considerably reduced by the torsional vibration damper compared to its state when introduced at the crankshaft 2.

Naturally, depending on design, the cutout 18 can also be dimensioned in the circumferential direction so as to be wider at its narrow region 21, so that it receives the projections 38 with play in the circumferential direction.

Up to this point, the operation of the torsional vibration damper has been described without reference to the effect of the spring elements 22 in the recesses 20. The action of these spring elements 22 will be explained more fully with reference to FIGS. 4 to 8. As can be seen in FIG. 4, the spring element 22 rests at both sides of the center of the recess 20 on the support locations 42, 43 which project inward radially opposite the radial outer boundary 50 of the rest of the recess 20. In the center position of the coupling body 26 shown in FIG. 4, this coupling body 26 is pressed outward radially under the influence of centrifugal force and accordingly deforms the spring element 22 in such a way that it approaches the radial outer boundary 50 of the recess 20. The angle of wrap between the projection 38 of the coupling body 26 and the guide path 24 formed by the spring element 22 is accordingly enlarged, so that the area pressure acting between these two elements, namely, the coupling body 26 and the guide path 24, is substantially reduced. Further, proceeding from this center position, the guide path 24 is steeper, that is, it extends radially inward with a greater curvature than in the unloaded state, so that a deflection of the coupling body 26 out of this position into the position according to FIG. 5, for example, is more pronounced than in a construction without the spring element 22. In the deflected state as shown in FIG. 5, because of the spring element 22, the guide path 24 extends more steeply than it would without a spring element with an even greater deflection of the coupling body 26 before the support location 42 has been reached, while the curvature of the guide path 24 in the radial inward direction is substantially reduced in the case of a deflection beyond the support location 42. The spring element 22 presses the coupling body 26 against the complimentary running path 53 up to a predetermined rate of rotation.

In contrast, when a third support location 44 is added in the central area of the recess 20, the deformation behavior of the spring element 22 is changed in such a way that the guide path 24 is especially flat in this central area with respect to curvature; therefore, deflections of the coupling body 26 are carried out against a relatively small resistance. Conversely, however, a position can occur in the region between two such support locations 42, 44 or 44, 43 in which the coupling body 26 must overcome a substantially increasing curvature in the case of a further deflection from its center position.

Figure 7:
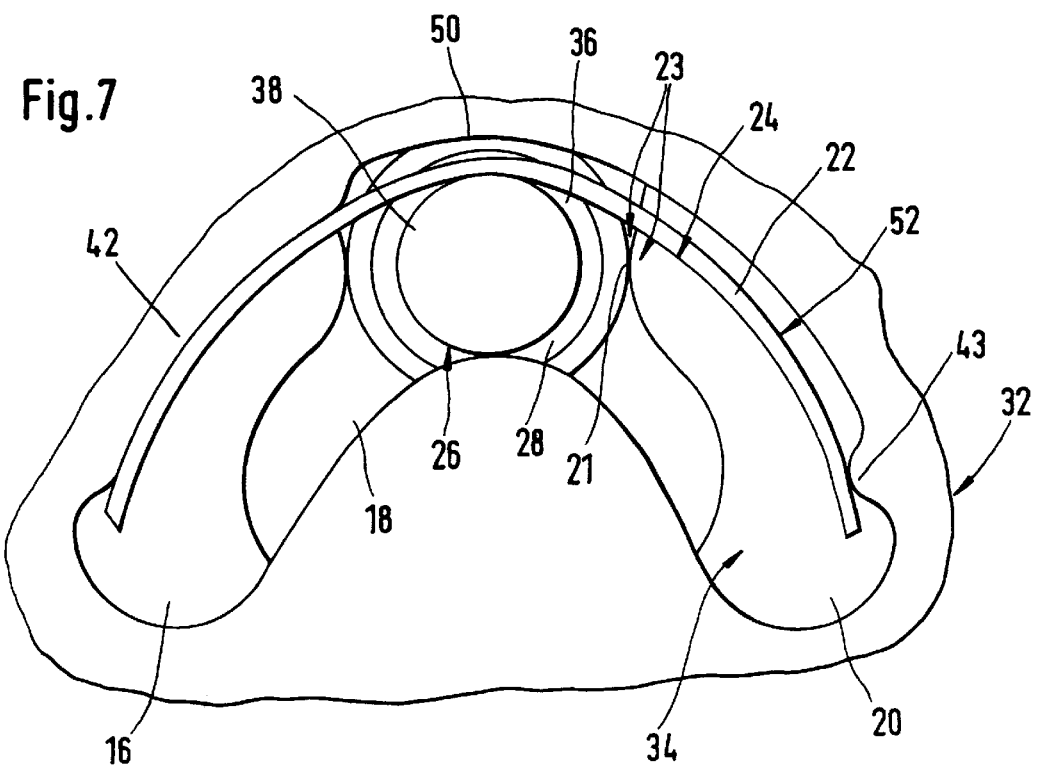
FIG. 7 corresponds to FIG. 4, but shows supports of different dimensioning in the circumferential direction.
Figure 8:
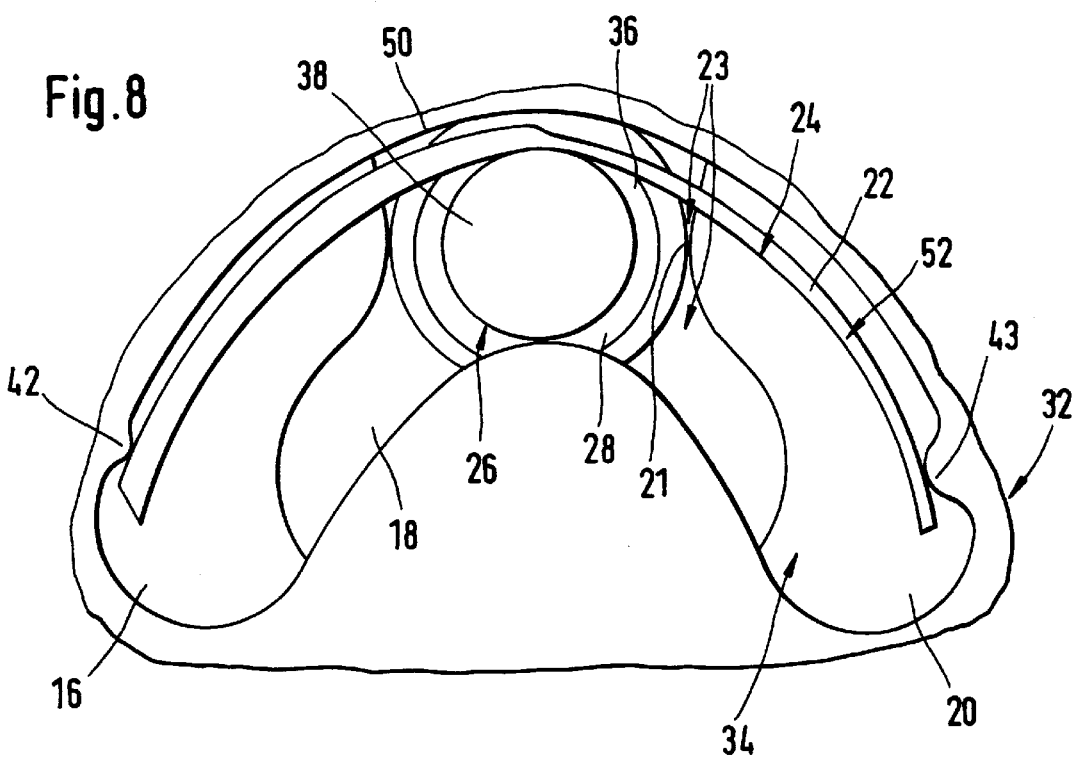
FIG. 8 corresponds to FIG. 4, but has a spring element whose thickness changes along its extension.

FIG. 7 shows a construction in which the support location 42 to the left of the central area in the circumferential direction has substantially greater dimensions than the support location 43 to the right of this central area. In this case, the spring element 22 in the supporting region of this support location 42 will turn out to be an almost rigid guide path 24, whereas in the circumferential direction between the central area and the support location 43 the guide path 24 behaves in the manner that was extensively described with reference to FIGS. 4 and 5. A similar effect results from the construction of the spring element 22 according to FIG. 8, since the spring portion with a very thick cross section to the left of the central area increasingly resembles a rigid element, while the portion to the right of this central area behaves like an elastic spring element. Consequently, in the embodiments shown in FIGS. 7 and 8, the torsional vibration damper is constructed so that relative deflections between the drive-side and driven-side transmission element have a different damping behavior in a first working direction than in a second working direction.

Figure 9:
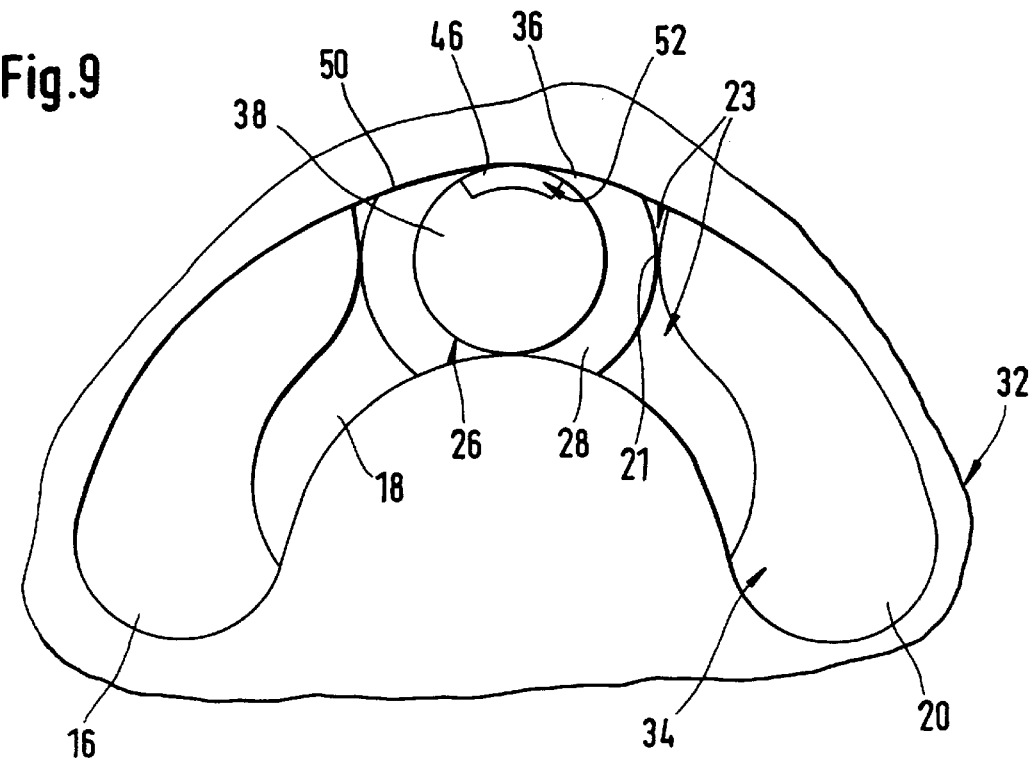
FIG. 9 has an elastic lining or facing at the coupling body.

FIG. 9 shows another embodiment in which a facing 46 used in the rolling body 36 produces the elasticity between the guide path 24 and the coupling body 26. In this case, the facing 46 undergoes a deformation under loading brought about by centrifugal force, the curvature of the coupling body being adapted to that of the guide path 24 by means of this deformation. A deflection of the coupling body 26 from its center position requires that varying degrees of resistance are overcome depending on this deformation.

Both the facing 46 and the spring element 22 described above act as a path body 52.

A conventional friction clutch, by means of which a gear unit arranged subsequent to the torsional vibration damper can be coupled or uncoupled, is attached to the side of the driven-side transmission element 34 remote of the coupling body 26 in a conventional manner which is therefore not described.

The solution according to the invention with the spring elements 22 is described with reference to an embodiment example of a two-mass flywheel. However, spring elements 22 of this type to form a guide path 24 for a coupling body 26 can also be used in a conventional clutch disk to achieve the same advantages. A clutch disk of this kind, although without the spring elements 22 according to the invention, is described in German Patent Application 197 26 532.4. Further, the spring elements according to the invention can also be used in curved paths to achieve the above-described advantages, wherein, according to German Patent Application 197 02 666.4, the rolling body of the coupling body is received in these curved paths as a guiding means which is swivelably supported at the other transmission element. Since support locations which face radially inward are provided in the two above-mentioned patent applications only at the desired locations of the respective recess for supporting the respective spring element, description and depiction thereof will not be repeated.

The invention is not limited by the embodiments described above which are presented as examples only but can be modified in various ways within the scope of protection defined by the appended patent claims.

I claim:

1. A torsional vibration damper, comprising:

two transmission elements which are rotatable relative to one another about a common axis of rotation;

coupling elements displaceable between the transmission elements along at least one guide path in a circumferential direction and in a working connection with the two transmission elements so as to permit relative movement between the transmission elements, the guide path being provided on at least one of the transmission elements so as to have a curvature with varying distance from the axis of rotation and a curvature location having a maximum distance from the axis of rotation, the coupling elements including a coupling body provided at another of the transmission elements so as to be received by the guide path, the coupling body having a rolling area facing the guide path, with its own curvature; and a path body of predetermined elasticity provided on one of the guide path and the coupling body at least along a partial area of the respective curvature so that when loaded by an other of the guide path and the coupling body a deformation is achieved for adapting the curvature shape of the path body to the curvature of the other of the guide path and the coupling body, the path body having a thickness along its length that varies so as to influence elasticity.

2. A torsional vibration damper according to claim 1, wherein a plurality of support members are provided at one of the transmission elements, the guide path being a spring element arranged at the transmission element by means of the support members so as to form the path body.

3. A torsional vibration damper according to claim 1, wherein the path body is supported at the one of the guide path and the coupling body by two respective support members arranged at a distance from one another, whereby elasticity of the path body is influenced by the distance between the support members and dimensioning of the support members in a direction of the path body.

4. A torsional vibration damper according to claim 1, wherein the path body is an elastically deformable facing provided at the coupling body at least along a region of the coupling body that rolls on the guide path.

5. A torsional vibration damper according to claim 2, wherein the spring element is configured to press the coupling body against a complementary running path in one of the transmission elements up to a predeterminable rate of rotation.

* * * * *